Figure 1:
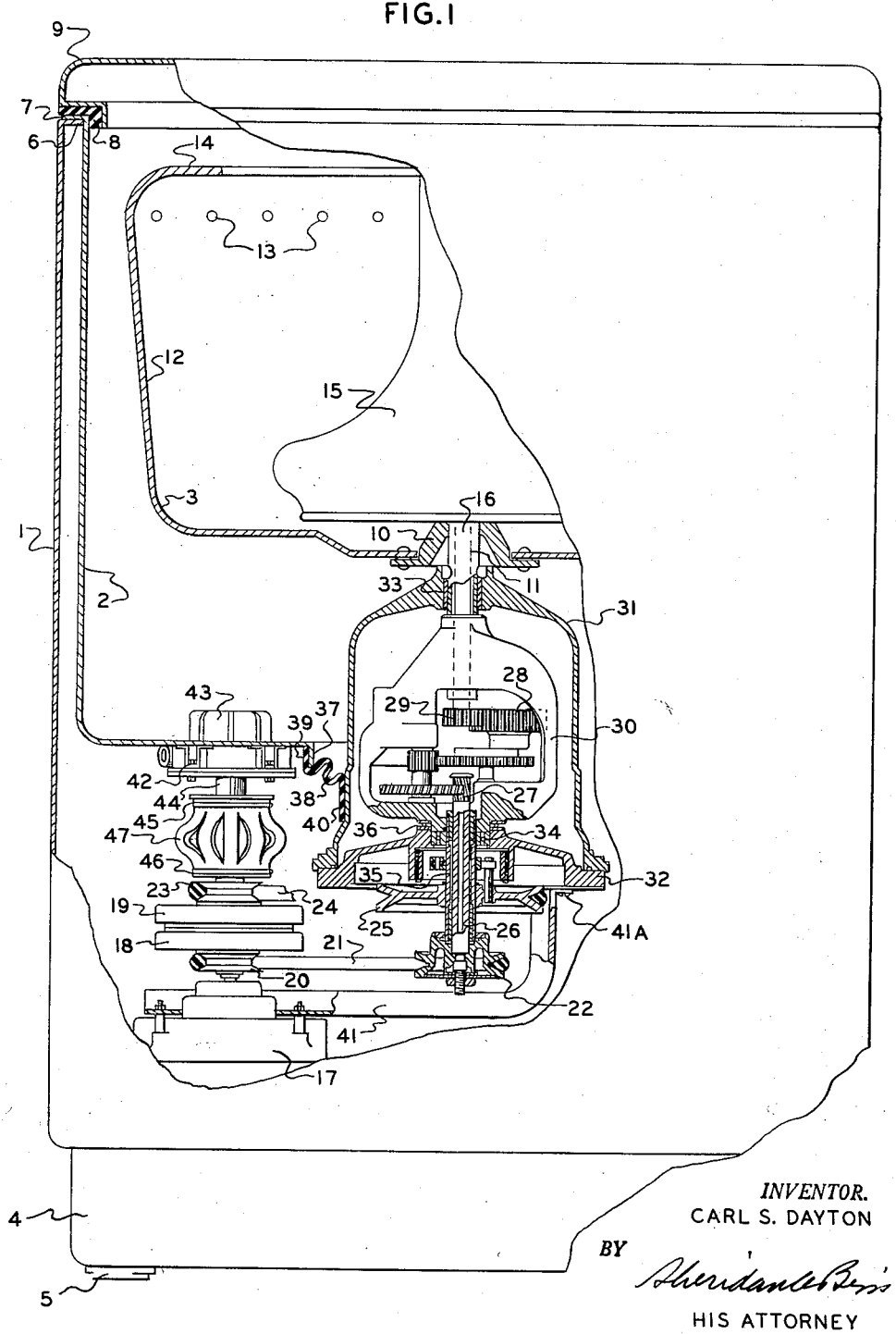

July 29, 1958

C. S. DAYTON 2,845,156

TORQUE TRANSMISSION AND AUTOMATIC BRAKING MEANS
FOR CLOTHES WASHERS AND THE LIKE

Filed Dec. 16, 1953

2 Sheets-Sheet 1

INVENTOR.
CARL S. DAYTON
BY
HIS ATTORNEY

July 29, 1958  C. S. DAYTON  2,845,156
TORQUE TRANSMISSION AND AUTOMATIC BRAKING MEANS
FOR CLOTHES WASHERS AND THE LIKE
Filed Dec. 16, 1953 2 Sheets-Sheet 2

INVENTOR.
CARL S. DAYTON
BY
HIS ATTORNEY

United States Patent Office 2,845,156
Patented July 29, 1958

2,845,156

TORQUE TRANSMISSION AND AUTOMATIC BRAKING MEANS FOR CLOTHES WASHERS AND THE LIKE

Carl S. Dayton, Schenectady, N. Y., assignor to General Electric Company, a corporation of New York Application December 16, 1953, Serial No. 398,547

2 Claims. (Cl. 192—8)

This invention relates to power transmissions for automatic washing machines and the like, and more particularly to such a transmission including a self-energizing brake.

While not necessarily so limited, this invention is particularly useful in connection with the transmission of an automatic washing machine of the type having a rotatable clothes basket and an agitator within the basket. During agitation, the basket preferably is restrained from motion so that maximum washing action is imparted to the liquid. For centrifugal extraction, when the basket is rotated at high speed, the restraining means or brake must be released. However, upon conclusion of centrifugal extraction and termination of the power drive to the wash basket, the substantial inertia of the rotating system requires a braking force to stop the basket quickly for unloading.

One of the objects of this invention is to provide a transmission including a brake which is self-energizing when input driving torque is terminated, and is self-releasing whenever driving torque is applied.

Another object of this invention is to provide a fast-acting brake to produce a maximum braking force for a given size of brake structure. In this connection, it is an objective of this invention to obtain increased braking force by utilization of the high break-away force of static friction.

A further object of this invention is to so construct a brake whereby it is effective to snub rotation in either direction; but is released by application of input driving torque.

A still further object of this invention is to arrange a self-energizing brake to provide a braking force of high magnitude, but which is unlatched upon transmission of a low magnitude torque.

In carrying out my invention in one form as applied to an automatic clothes washer, the brake band is normally stationary and frictionally engages the power transmission frame. The spin shaft, carrying the rotatable clothes basket, includes a hub to which is pivotally secured a brake latch. While this latch is free to move in a plane generally perpendicular to the shaft axis, it is resiliently biased outwardly toward the brake band. A notch on this latch member cooperates with a tab on the brake band so that shaft rotation is restrained or retarded by the brake. The end of the latch, opposite its pivotal mounting, is in the form of a cam surface cooperatively associated with a drive pin projecting from an input driving pulley. Upon transmission of torque from the input driving pulley, the latch is cammed inwardly to release the brake, while transmitting the torque to the spin shaft through the latch and its pivotal connection to the hub.

This invention will be better understood from the following description taken in connection with the accompanying drawings, and its scope will be pointed out with particularity in the appended claims.

Figure 2:
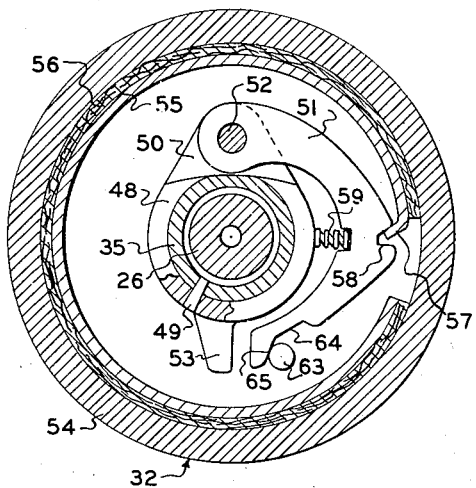
Figure 3:
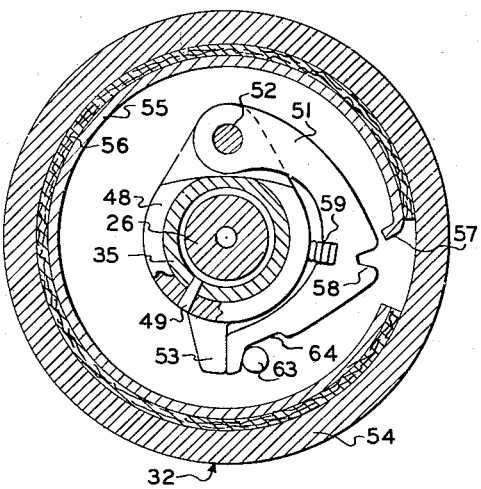
Figure 4:
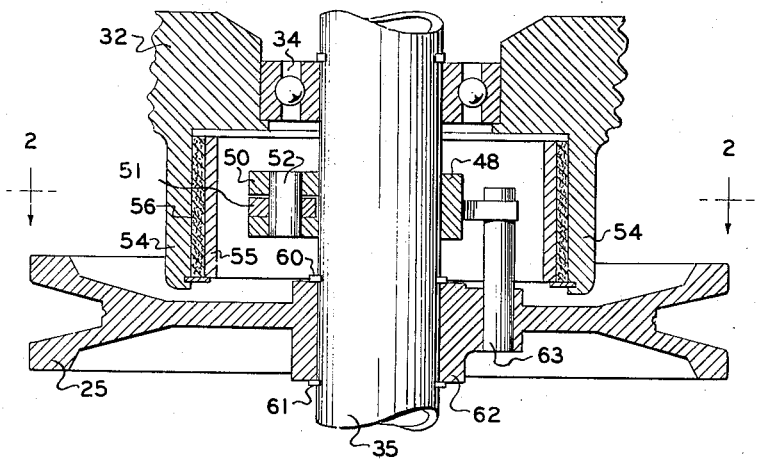

Referring to the drawings, Fig. 1 is an elevation, partially in section, through an automatic clothes washing machine embodying the invention; Fig. 2 is an enlarged partial plan view in section on the line 2—2 of Fig. 4 through a portion of the device, illustrating one of its operative positions, brake engaged; Fig. 3 is a view similar to Fig. 2 illustrating the device in another of its operative positions, brake disengaged; and Fig. 4 is a cross-sectional elevation through the device illustrated by Figs. 2 and 3.

While there are many obvious applications for a self-energizing brake and torque transmission in accordance with the teachings of this invention, I have shown by way of example an application of this invention to an automatic clothes washing machine of exemplary construction. As shown by Fig. 1, this machine is of the type including an outer enclosing casing 1 supporting an inner liquid containing tub 2, within which is rotatably mounted a clothes basket 3. Outer casing 1, in accordance with usual practice, may include a base frame structure 4 to which a plurality of adjustable supporting feet 5 are attached. The upper edge of the outer casing is flanged inwardly as at 6 to receive a mating flange 7 of tub 2, and through this construction tub 2 may be supported within the casing. Overlying these mating flanges is a flexible gasket 8 upon which rests a top cover 9.

Basket 3 may be attached to and is supported by a central hub 10 which in turn forms a part of and is rigidly secured to a spin tube 11. Basket 3 is of the type formed with upwardly extending and slightly outwardly flared side walls 12, with a plurality of liquid overflow apertures 13 at the portion of the basket side wall of maximum diameter. The uppermost edge of basket 3 is rolled inwardly as at 14 to define a clothes barrier preventing projection and flotation of clothes within basket 3 into outer tub 2.

Positioned within basket 3 is a suitable agitator 15 supported and driven by an internal shaft 16 extending upwardly through spin tube 11. Agitator 15 is driven with an oscillatory motion, as will be presently described, to impart a washing motion to liquid and detergent within basket 3, thereby effectively cleansing articles of clothing within the basket. In accordance with usual practice, it is to be understood that upon conclusion of the agitation of the articles of clothing within the basket, the basket is rotated at a high speed to centrifugally extract the washing liquid, at which time such washing liquid passes outwardly into tub 2 through apertures 13.

Motive power for driving agitator 15 and rotating basket 3 may be provided by means of an electric motor 17, preferably of the type which is reversible depending upon the relative polarity of power applied to the windings of the motor. Motor output provides driving torque through a bi-directional clutch structure consisting of a clutch half 18 for the agitator drive and a top clutch half 19 for the spin basket drive. This clutch is of the type which is effective to transmit torque through only one-half of the clutch upon rotation in a first direction, with transmission of torque through the other clutch half upon reverse direction of rotation of the motor. As herein shown, clutch half 18, through driving pulley 20 and belt 21, drives input pulley 22 for the agitator drive. Similarly, rotation of motor 17 in the reverse direction through clutch half 19 provides driving torque to pulley 23 which, through belt 24, provides input torque to the transmission through pulley 25. Rotation of agitator drive pulley 22, through shaft 26, drives gear train pinion 27. Through the gear train indicated generally by the numeral 28, the rotational motion of pinion 27 is converted into an oscillatory motion of the output pinion 29 secured to agitator drive shaft 16. Thus, upon rotation of the driven pulley 22, agitator 15 is driven with an oscillatory motion. However, when spin pulley 25 is rotated, power is transmitted to the entire gear frame 30, which thereby rotates at the same speed as pulley 25. Gear frame 30 forms an integral part of and is secured to spin tube 11, whereby rotation of basket 3 at the same speed as pulley 25 results.

The transmission construction as thus far described forms no part of the present invention but is shown and described by way of background for a better understanding of this invention. This transmission and clutch construction is disclosed in greater detail and is claimed in the patents issued to J. W. McNairy, Numbers 2,639,618 and 2,639,794, both issued on May 26, 1953, and assigned to the General Electric Company, assignee of this application.

The transmission assembly, including the gear train 28 and gear frame 30, preferably is sealed within an enclosing casing comprising an upper bell-shaped housing 31 appropriately secured to a base plate 32. Upper housing 31 provides a bearing 33 for the spin tube. Base plate 32 includes a suitable bearing 34 for input spin shaft 35, and also provides support for a thrust bearing 36 upon which the weight of gear frame 30, spin tube 11, and basket 3 is carried.

Outer tub 2 is provided with a central flanged aperture 37 through which gear case 31 extends. A liquid tight and flexible seal is provided between the gear case and the tub by means such as a flexible boot 38 having a plurality of convolutions, which boot is bonded in a liquid-tight manner to the tub at 39 and to the gear case at 40. With this arrangement, the liquid seal is preserved while permitting limited relative motion between the gear case and the stationary tub. Basket 3 along with gear case 31, base plate 32, and motor 17 are all connected together to form the moving system of the machine, so that upon existence of an unbalanced load within basket 3, this entire moving system is free to gyrate in a well-understood manner. As shown in Fig. 1, motor 17 may be carried for example on a bracket arm 41 secured at 41a to base plate 32 of the gear case. Additional supporting brackets and reinforcing members (not shown) may be added as required to support properly motor 17 from gear case 32. It is to be understood further that this entire moving system may be resiliently supported with respect to outer casing 1 and base frame 4 by any suitable flexible or resilient means (not shown).

To dispose of liquid discharge from basket 3 into tub 2 during centrifugal extraction, a pump 42 of generally conventional construction is employed. The inlet to this pump may be screened by a member 43. The pump is driven by its input shaft 44 having a drive plate 45 secured thereto. A motor shaft extension provides a driving connection to a similar and oppositely faced drive plate 46; and a universally flexible interconnecting member 47 establishes the driving connection from motor 17 to pump 42. With this construction, the pump may remain within the stationary system, while motor 17 is in the so-called moving system.

The present invention is particularly directed to the means for transmitting driving torque to spin basket 3 and for restraining or retarding rotation of the basket during periods of operation when driving torque is not so transmitted. The details of this torque transmitting and braking means will be better understood by reference to Figs. 2-4. As shown, spin input shaft 35 has secured thereto a driving hub 48 by means such as a key or pin 49. A portion 50 of hub 48 is in the form of a yoke adapted to pivotally mount a latch arm 51 by means such as a pin 52 for movement in a plane substantially perpendicular to the axis of shaft 35. On the opposite side of the rotational axis from pin 52, hub 48 is provided with an outwardly extending ear 53 for a purpose which will be apparent from the following description. Latch arm 51 is formed on its side adjacent hub 48 with substantially the same arcuate shape as the hub so that it can pivot to an inner position in which it is substantially contiguous to the hub.

Base plate 32 of the gear casing is formed with an annular flange 54 substantially concentric with shaft 35 enclosing a spring steel brake band 55 having a lining of friction material 56 bonded thereto. Brake band 55 is so formed that it tends to spring outwardly thereby compressing lining 56 into engagement with the interior surface of annular flange 54. This brake band further includes an inwardly directed tab 57. Thus, the brake band and its friction lining normally remains stationary in view of its frictional contact with base plate 32 of the gear casing.

Operative engagement of the brake band with latch member 51 is provided by means such as a notch 58 cooperable with projecting tab 57 on the brake band. By means of a compression spring 59, the latch arm 51 is biased outwardly whereby notch 58 comes into operative engagement with the tab 57 of the brake band. Since latch 51 is pivotally secured through hub 48 to the spin tube and hence basket 3, it is seen that with the components in the Fig. 2 position, rotation of basket 3 is restrained or retarded.

The input driving pulley 25 is journaled on the spin input shaft 35 as shown clearly by Fig. 4. The relative axial position of the input driving pulley is established by upper and lower snap rings 60 and 61 respectively. Pressed or otherwise anchored into hub 62 of pulley 25 is a driving pin 63 projecting upwardly through the plane of rotation of latch arm 51. The end of latch member 51, opposite its pivotal mounting, is shaped to provide a notch 64 and a cam surface 65 cooperatively associated with drive pin 63.

When input driving pulley 25 and drive pin 63 are rotating in a clockwise direction as viewed in Figs. 2 and 3, pin 63 engaging cam surface 65 of the latch arm forces the latch arm inwardly, compressing biasing spring 59. Torque may thus be transmitted to the spin shaft through the latch arm and hub 48. To strengthen the device further, the outwardly projecting ear 53 on the hub is provided and arranged to be contacted by the free end of latch member 51. As clearly shown by Fig. 3, this inward movement of the latch arm upon transmission of torque through pin 63 effectively disengages tab 57 of the brake band from notch 58 of the latch arm. Basket 3 therefore may be driven freely by motor 17 as described in connection with Fig. 1.

However, if at any time the transmission of torque ceases, the relatively large mass and inertia of basket 3 tends to continue the basket and spin tube in motion in the same direction. Under these circumstances, shaft 35, hub 48, and latch arm 51 tend to rotate in advance of pin 63, returning the components to the Fig. 2 position. As can be seen readily from an examination of Fig. 2, this action results in reengagement of notch 58 with tab 57 on the brake band. Since during power drive there is no relative motion of the brake band with respect to flange 54 of the gear case base plate, the initial braking force consists of the static break-away friction between the brake band and the base plate. As is well known in the art, static break-away friction is substantially greater than running friction, and therefore with a brake of this construction, I am able to obtain a very large initial retarding force tending to stop continued rotation of basket 3. Furthermore, it can be seen that the brake is entirely self-energizing as soon as torque transmission from pin 63 ceases.

Whenever it is desired to again drive basket 3 for centrifugal extraction, input rotation of driving pulley 25 through pin 63 immediately moves latch member 51 inwardly to disengage the brake. By constructing tab 57 of the brake band and notch 58 of the latch arm in properly cooperating relation, essentially as shown by Figs. 2 and 3, a very small amount of torque is required to release the brake, the amount of torque being determined primarily by the characteristics of compression spring 59. In any event, with the construction as thus disclosed it is possible to obtain a very large braking force for a relatively small brake, while providing such a brake in which the torque or force required for brake release bears no relation whatsoever to the magnitude of the braking force.

While this invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In a transmission, a driven shaft, a stationary housing having bearing means rotatably supporting said driven shaft and having an internal annular braking surface concentric with the axis of rotation of said driven shaft, a hub secured to said driven shaft, a latch arm pivotally mounted on said hub for movement in a plane substantially perpendicular to said shaft axis, said latch arm having a generally arcuate shape of inside radius approximating the hub radius whereby said latch may occupy a position contiguous to the exterior surface of said hub, cam means on the end of said latch arm opposite its pivotal mounting, a driving shaft including driving means engageable with said cam means to cam said latch inwardly and transmit driving torque through said hub to said driven shaft, resilient means biasing said latch outwardly, a resilient brake band frictionally engaging said internal annular braking surface stationary with respect to said housing during rotation of said driven shaft and having an internally projecting tab thereon, and a catch surface formed on a portion of said latch arm and engageable with said tab when said latch arm moves outwardly under the influence of said resilient means, thereby to rotate said brake band with respect to said braking surface to retard rotation of said driven shaft.

2. A transmission and brake for a centrifugal extractor basket or the like comprising a stationary transmission housing, a spin shaft for the basket journalled with respect to said housing, a brake band frictionally engaged with said housing and normally remaining stationary with respect thereto during rotation of said spin shaft and having a tab projecting therefrom, a hub secured to said spin shaft, a latch arm pivotally secured to said hub movable transversely with respect to the axis of said spin shaft and having formed therein a notch for engagement with said tab to interlock the latch arm and brake band together and thereby lock said hub to said brake band and cause the brake band to rotate and thus restrain said spin shaft from rotation, means normally biasing said latch arm toward a position wherein said tab and notch are engaged, a cam surface on said latch arm, and a driving member engageable with said cam surface to disengage said latch arm from said brake band responsive to transmission of driving torque through said latch arm to said spin shaft.

References Cited in the file of this patent
UNITED STATES PATENTS

| | | |
|---|---|---|
| 1,117,157 | Bedard | Nov. 17, 1914 |
| 1,170,216 | Blanch | Feb. 1, 1916 |
| 1,824,150 | Howe | Sept. 22, 1931 |
| 2,161,604 | Watts | June 6, 1939 |
| 2,710,935 | Luebking | June 14, 1955 |